(12) United States Patent
Nakaya

(10) Patent No.: US 7,380,869 B2
(45) Date of Patent: Jun. 3, 2008

(54) AERODYNAMIC DEVICE FOR VEHICLE

(75) Inventor: Hiroyuki Nakaya, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 11/653,234

(22) Filed: Jan. 16, 2007

(65) Prior Publication Data

US 2007/0182207 A1   Aug. 9, 2007

(30) Foreign Application Priority Data

Jan. 16, 2006   (JP) .............................. 2006-007740

(51) Int. Cl.
*B60R 27/00* (2006.01)
(52) U.S. Cl. .................. 296/180.1; 296/180.2
(58) Field of Classification Search ............. 296/180.1, 296/180.2, 180.3, 180.4, 180.5, 198; D12/88; 180/903; 280/851, 855, 848
See application file for complete search history.

(56) References Cited

U.S. PATENT DOCUMENTS

| | | | | |
|---|---|---|---|---|
| 4,498,806 A | * | 2/1985 | Szonnell ...................... | 405/34 |
| 5,820,203 A | * | 10/1998 | Morelli et al. ............ | 296/180.1 |
| 6,033,010 A | * | 3/2000 | Preiss ...................... | 296/180.1 |
| 6,712,425 B2 | * | 3/2004 | Brulhart ................... | 296/180.1 |

FOREIGN PATENT DOCUMENTS

| | | |
|---|---|---|
| EP | 1040985 | 10/2000 |
| EP | 1405783 | 4/2004 |
| FR | 3858793 | 3/2005 |
| GB | 2 017 023 | 10/1979 |
| JP | 8-318876 | 12/1996 |
| JP | 2004-314778 | 11/2004 |
| JP | 2006-256517 | 9/2006 |

OTHER PUBLICATIONS

Japan Institute of Invention and Innovation Disclosed Technology Bulletin No. 2002-1877.
Preliminary French Search Report of French Patent No. FR 07 52697, dated Jan. 16, 2007.

* cited by examiner

*Primary Examiner*—Lori L. Lyjak
(74) *Attorney, Agent, or Firm*—Finnegan, Henderson, Farabow, Garrett & Dunner, LLP

(57) ABSTRACT

An aerodynamic device for a vehicle has, within a wheel house in which a front wheel is disposed, a movable liner portion which can, along a vehicle longitudinal direction, approach and move away from a vehicle longitudinal direction front side portion of the front wheel. When a traveling speed of a vehicle exceeds a predetermined speed, a lower portion of the movable liner portion approaches the front side portion of the front wheel. An aerodynamic device for a vehicle is obtained which can suppress flowing-in of air into a wheel house accompanying traveling of a vehicle.

18 Claims, 10 Drawing Sheets

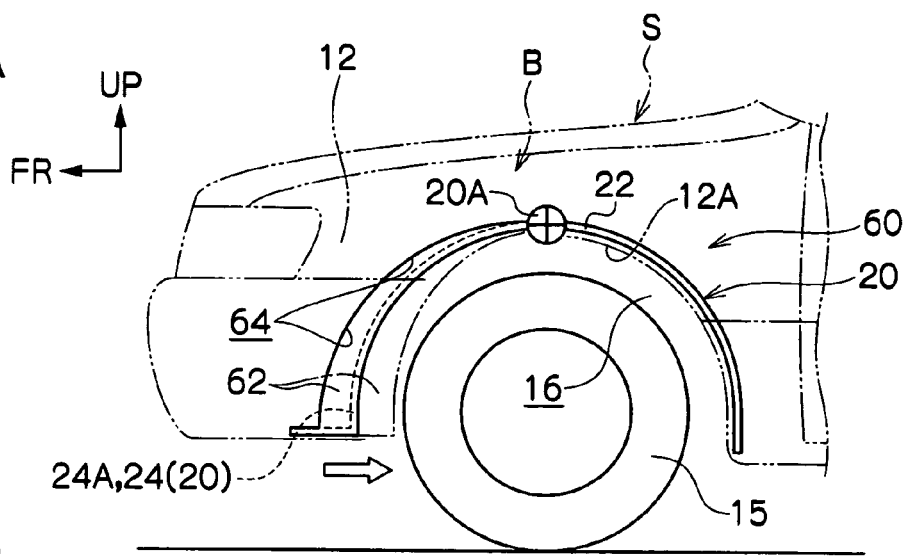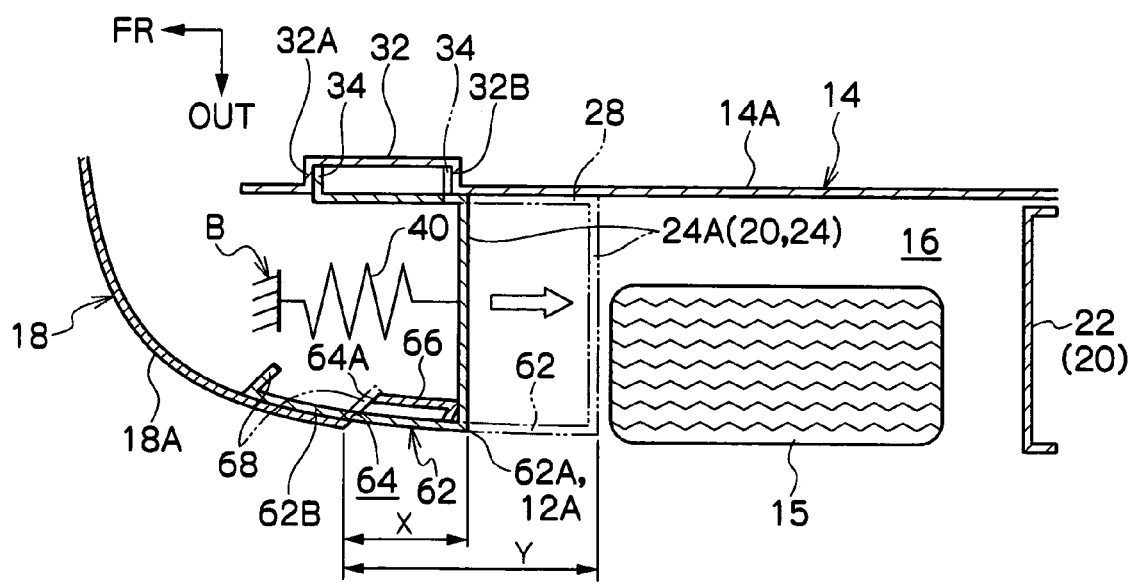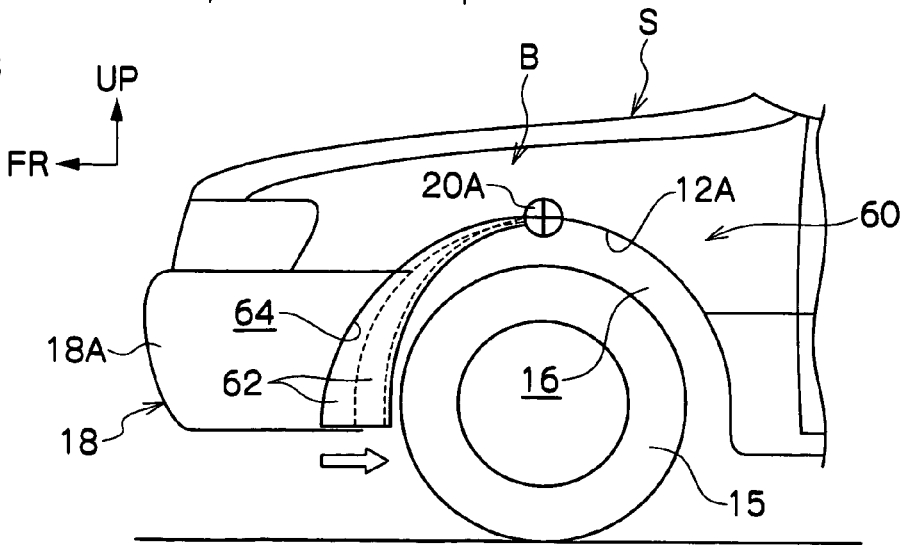

AERODYNAMIC DEVICE FOR VEHICLE

CROSS-REFERENCE TO RELATED APPLICATION

This application claims priority under 35 USC 119 from Japanese Patent Application No. 2006-007740, the disclosure of which is incorporated by reference herein.

BACKGROUND OF THE INVENTION

1. Field of the Invention

The present invention relates to an aerodynamic device for a vehicle for adjusting the flow of air of a wheel house.

2. Description of the Related Art

It is known that, as an automobile travels, the air which flows into the wheel house is blown-out to the side of the front wheel, and disturbs the flow of air at the side of the front wheel. Specifically, at an automobile S2 shown in FIG. 10, the distance, along the vehicle longitudinal direction, between the front portion (a fender liner 20) of a wheel arch 12A and a front surface side of a front wheel 15 is substantially constant regardless of the vehicle speed. The air which hits the front surface of the front wheel 15 is sucked-into the front portion of a wheel house 16 by the negative pressure which arises accompanying the traveling, and flows-in to the interior of the wheel house 16. Due to the flow path, within the wheel house 16, of the air which flows-in (the space between the front wheel 15 and the fender liner 20) being narrow, the flow speed downstream of this negative pressure portion suddenly drops, and a relatively high-pressure region H shown in FIG. 10 is generated. In this way, the air which reaches region H overflows, and is blown-out from the opening portion of the wheel house 16 which is directed toward the outer side in the vehicle transverse direction, i.e., from between the wheel arch 12A and the front wheel 15. In this way, the air flow at the side of the front wheel 15 is disturbed, and the air resistance increases. Note that reference numeral 12 in the drawing denotes a front fender panel, reference numeral 18 denotes a front bumper, and reference numeral 18A denotes a bumper cover.

A technique is known (see, for example, Japanese Patent Application Laid-Open (JP-A) No. 8-318876) which provides a movable wheel arch fairing for enabling expansion and contraction of the interval between the wheel and the wheel arch. When the vehicle travels at high speed, the wheel arch fairing is in a state of usage in which it protrudes-out beneath the wheel arch, and suppresses the drawing-in of air into the wheel arch. When the vehicle is traveling off-road, the wheel arch fairing is in a housed state in which it is housed in the wheel arch, and permits a large stroke of the wheel.

However, in the conventional technique such as described above, the wheel arch fairing is merely a structure which opens and closes the opening end at the side of the wheel house, i.e., the entrance/exit of air. Therefore, it is difficult to suppress the inflow of air into the wheel house from between the fender liner and the front wheel which accompanies traveling of the vehicle, and there is room for improving on the increase in air resistance caused by air being blown-out to the side of the front wheel.

SUMMARY OF THE INVENTION

In view of the aforementioned, an object of the present invention is to provide an aerodynamic device for a vehicle which can suppress the flowing-in of air into a wheel house as a vehicle travels.

An aerodynamic device for a vehicle of a first aspect of the present invention for achieving the above-described object has: an aerodynamic member mounted so as to be able to, in a vehicle longitudinal direction, approach and move away from a vehicle longitudinal direction front side portion of a wheel, within a wheel house in which the wheel is disposed.

In a vehicle to which the aerodynamic device for a vehicle of the first aspect of the present invention is applied, when the aerodynamic member, which is positioned at the front side of the wheel (the advancing side as the vehicle travels), is made to approach the front side portion of the wheel in the vehicle longitudinal direction (the traveling direction) within the wheel house, the space in the wheel house in front of the wheel becomes smaller, and inflow of air into the wheel house is suppressed.

In this way, in the aerodynamic device for a vehicle of the first aspect of the present invention, the flowing of air into the wheel house as the vehicle travels can be suppressed. Accompanying this, the air flow, which flows-into the wheel house, being blown-out to the side of the wheel and disturbing the flow of air at the side of the wheel is suppressed, and therefore, the air resistance can be reduced.

In the aerodynamic device for a vehicle of the above-described first aspect of the present invention, the aerodynamic member may be formed in the shape of a plate which covers, from a front side in the vehicle longitudinal direction, a region which includes a central portion of the wheel in a vehicle top-bottom direction.

In the aerodynamic device for a vehicle of the above-described structure, the aerodynamic member is formed in the shape of a plate which covers the wheel from the front. Therefore, due to the aerodynamic member approaching the wheel, the space in the wheel house in front of the wheel is made to be smaller over a wide range in the vehicle transverse direction, and flowing-in of air into the wheel house is effectively suppressed.

In the aerodynamic device for a vehicle of the first aspect of the present invention, the aerodynamic member may include a portion which is positioned at a front side of the wheel in the vehicle longitudinal direction, at a fender liner which covers an upper portion of the wheel from above in a vehicle top-bottom direction.

In the aerodynamic device for a vehicle of the above-described structure, the aerodynamic member is structured by making the front portion of the fender liner be able to approach and move away from front side portion of the wheel. Therefore, an increase in the number of parts and the mass can be prevented or suppressed.

In the aerodynamic device for a vehicle of the first aspect of the present invention, the aerodynamic member may be set so as to approach the front side portion of the wheel more when a traveling speed of a vehicle is high than when low.

In the aerodynamic device for a vehicle of the above-described structure, inflow of air into the wheel house is suppressed by making the aerodynamic member approach the front surface side of the wheel at the time when the vehicle travels at high speed which is when the amount of inflow of air into the wheel house increases. Namely, the flowing-in of air into the wheel house is suppressed in cases in which the aerodynamic performance improving effect due to the suppression of inflow of air into the wheel house is strong.

In the aerodynamic device for a vehicle relating to the first aspect of the present invention, the aerodynamic member may be supported at a vehicle body so as to approach the front side portion of the wheel due to negative pressure which arises at a front of the wheel in the vehicle longitudinal direction within the wheel house accompanying traveling of the vehicle.

In the aerodynamic device for a vehicle of the above-described structure, the aerodynamic member is made to approach the wheel by utilizing the negative pressure which is generated at the front of the wheel within the wheel house as the vehicle travels. Therefore, an actuator which drives the aerodynamic member, or a control device for controlling the operational timing of such an actuator, can be rendered unnecessary. Note that the aerodynamic member may be, for example, a structure which is positioned at a close position near the wheel when the vehicle speed exceeds a predetermined threshold value. Or, the aerodynamic member may be, for example, a structure which approaches the wheel continuously or in stages in accordance with the vehicle speed.

The aerodynamic device for a vehicle of the first aspect of the present invention, may further have a bottom wall portion provided interlockably with the aerodynamic member, and covering a front portion of the wheel house from below in a vehicle top-bottom direction in a state in which the aerodynamic member is near a front surface side of the wheel.

In the aerodynamic device for a vehicle of the above-described structure, the flowing-in of air from below into between the front portion of the wheel house and the aerodynamic member (i.e., into the vehicle body) is suppressed by the bottom wall portion. Namely, disturbance of the flow of air at the periphery of the bottom wall portion is reduced, and air resistance can be reduced.

The aerodynamic device for a vehicle relating to the first aspect of the present invention may further have a side wall portion provided interlockably with the aerodynamic member, and covering a front portion of the wheel house from an outer side in a vehicle transverse direction in a state in which the aerodynamic member is near a front surface side of the wheel.

In the aerodynamic device for a vehicle of the above-described structure, the flowing-in of air from the side into between the front portion of the wheel house and the aerodynamic member (i.e., into the vehicle body) is suppressed by the side wall portion. Namely, disturbance of the flow of air at the periphery of the side wall portion is reduced, and air resistance can be reduced.

In the aerodynamic device for a vehicle of the above-described structure, the side wall portion may extend along an outer side surface of a vehicle body.

In the aerodynamic device for a vehicle of the above-described structure, the side wall portion extends along the outer side surface of the vehicle body (e.g., the fender, the bumper cover, the door, or the like), and is substantially flush with the outer side surface of the vehicle body in the state in which the side wall portion covers the front portion of the wheel house from the outer side in the vehicle transverse direction. Therefore, the flow regulating effect at the side surface of the vehicle body improves.

Further, in the aerodynamic device for a vehicle which is equipped with the above-described bottom wall portion or the above-described side wall portion, the bottom wall portion or the side wall portion may be formed integrally with the aerodynamic member.

In the aerodynamic device for a vehicle of the above-described structure, because at least one of the bottom wall portion and the side wall portion is made integral with the aerodynamic member, there is no need to provide an interlocking driving means therebetween, and the structure is simple.

In the aerodynamic device for a vehicle relating to the first aspect of the present invention, a flow regulating portion, which is positioned forward of the wheel and downward of a front edge portion of the wheel house and which is for regulating a flow of air accompanying traveling of a vehicle, may be provided at the aerodynamic member such that an amount of protrusion of the flow regulating portion downward of the front edge portion of the wheel house increases accompanying the operation of the aerodynamic member approaching the front side portion of the wheel.

In the aerodynamic device for a vehicle of the above-described structure, when the aerodynamic member approaches the front side portion of the wheel, the amount of protrusion of the flow regulating portion downward of the front edge portion of the wheel house increases. Because the flow regulating portion regulates the flow of air which is directed toward the wheel, the effect of suppressing entry of air into the wheel house owing to the aerodynamic member increases. Namely, by providing the flow regulating portion, the aerodynamic effect is synergistically improved.

An aerodynamic device for a vehicle relating to a second aspect of the present invention has: a flow regulating member, which is positioned forward of a wheel and downward of a front edge portion of a wheel house, for regulating a flow of air which accompanies traveling of a vehicle; and a driving means driving the flow regulating member such that an amount of protrusion of the flow regulating member downward with respect to the front edge portion of the wheel house increases, by negative pressure which is generated at a front side of the wheel within the wheel house accompanying traveling of the vehicle.

In the aerodynamic device for a vehicle of the above-described structure, when negative pressure which arises at the front of the wheel within the wheel house accompanying the traveling of the vehicle is generated, the driving means operates in accordance with this negative pressure, and causes the flow regulating member to protrude-out downwardly from the front edge portion of the wheel house. Due to the flow regulating member, which protrudes-out in this way, protruding-out at the front of the wheel, the flow regulating member regulates the flow of air which is directed toward the wheel. In this way, a flow regulating effect by the flow regulating member and corresponding to the traveling state of the vehicle can be obtained (adjusted), without providing an actuator for driving the flow regulating member or a control device which controls the operational timing of such an actuator.

Further, an aerodynamic device for a vehicle relating to a third aspect of the present invention is provided, and this aspect has: an aerodynamic member having a movable surface within a wheel house in which a wheel is disposed, the movable surface being disposed so as to face a vehicle longitudinal direction front side portion of the wheel; and a moving structure moving the movable surface so as to make the movable surface approach the front side portion of the wheel in accordance with a speed of a vehicle.

As described above, the aerodynamic device for a vehicle relating to the present invention can suppress flowing-in of air into a wheel house accompanying the traveling of a vehicle.

BRIEF DESCRIPTION OF THE DRAWINGS

FIG. 2A is a side view, FIG. 2B is a plan sectional view, and FIG. 2C is a side view seen with the automobile removed;

FIG. 3A is a schematic side view, and FIG. 3B is a graph showing the relationship between the longitudinal direction position of the wheel house and the pressure coefficient;

FIG. 5A is a side view and FIG. 5B is a plan sectional view;

FIGS. 7A through 7C are drawings schematically showing an aerodynamic device for a vehicle relating to a fifth exemplary embodiment of the present invention, where FIG. 7A is a side view, FIG. 7B is a plan sectional view, and FIG. 7C is a side view of an operating state;

FIG. 8A is a side view and FIG. 8B is a plan sectional view;

DETAILED DESCRIPTION OF THE INVENTION

An aerodynamic device 10 for a vehicle relating to a first exemplary embodiment of the present invention will be described on the basis of FIGS. 1 through 3. Note that arrow FR, arrow UP and arrow OUT shown appropriately in the respective drawings respectively indicate the forward direction (advancing direction), the upward direction, and the vehicle transverse direction outer side of an automobile S to which the aerodynamic device 10 for a vehicle is applied. Hereinafter, when upward, downward, frontward, rearward, and inner and outer sides in the transverse direction of the vehicle are indicated, they correspond to the directions of the aforementioned arrows.

Figure 1:
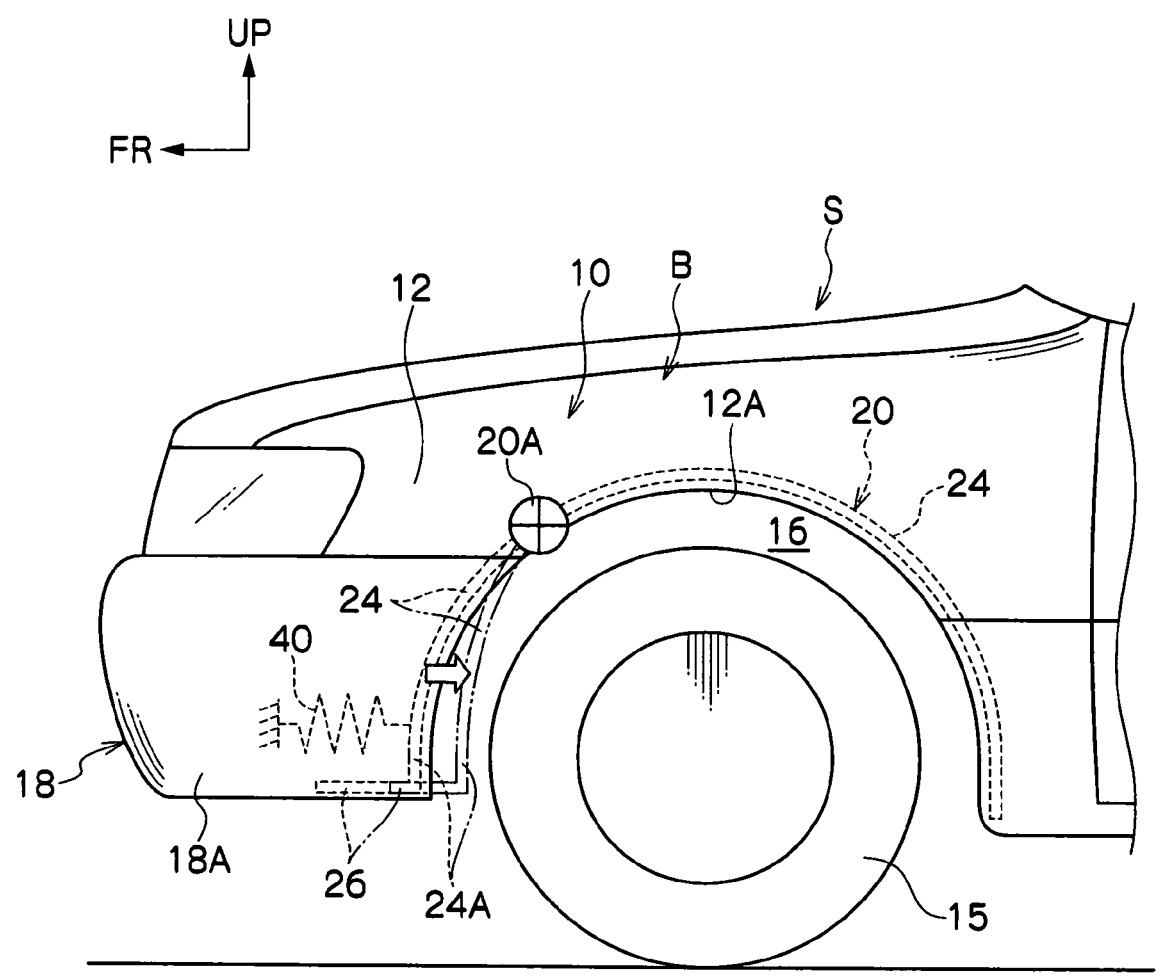
FIG. 1 is a side view showing an aerodynamic device for a vehicle relating to a first exemplary embodiment of the present invention.

The front portion of the automobile S to which the aerodynamic device 10 for a vehicle is applied is shown in side view in FIG. 1. Further, a side view of the aerodynamic device 10 for a vehicle is shown schematically in FIG. 2A, a plan sectional view of the aerodynamic device 10 for a vehicle is shown schematically in FIG. 2B, and a side view of an operating state of the aerodynamic device 10 for a vehicle, as seen with a vehicle body B removed, is shown schematically in FIG. 2C. Note that, in this exemplary embodiment, the aerodynamic device 10 for a vehicle is applied to each of left and right front wheels 15. However, because the left and right aerodynamic devices 10 for a vehicle are structured basically symmetrically, only the aerodynamic device 10 for a vehicle at one side in the vehicle transverse direction is shown in FIGS. 1 and 2A through 2C, and in the following explanation as well, description will be given with respect to one of the aerodynamic devices 10 for a vehicle.

As shown in FIGS. 1 and 2A through 2C, the automobile S has a front fender panel 12 which structures the vehicle body B. A wheel arch 12A, which is formed in the shape of a semicircular arc which opens downward in side view, is formed in the front fender panel 12 for allowing turning of the front wheel 15. A fender apron 14 (see FIG. 2B) is joined to the inner side of the front fender panel 12. A wheel house inner 14A and an unillustrated suspension tower are formed at the fender apron 14.

The wheel house inner 14A forms a wheel house 16 which is disposed at the vehicle transverse direction outer side of the wheel house inner 14A such that the front wheel 15 can be turned. The suspension tower supports the front wheel 15 via a front suspension such that the front wheel 15 can stroke in the top-bottom direction of the vehicle. Further, as shown in FIG. 1, a bumper cover 18A structuring a front bumper 18 goes round to the lower side of the front side portion of the wheel arch 12A at the front fender panel 12. The rear edge of this bumper cover 18A structures the front portion of the wheel arch 12A.

The aerodynamic device 10 for a vehicle has a fender liner 20. The fender liner 20 is formed by a thin resin member (a plate-shaped member), substantially in the shape of a semicircular arc which runs along the wheel arch 12A as seen in side view. The fender liner 20 is structured so as to be positioned at the upper portion of the wheel house 16 along the wheel arch 12A, and so as to cover the front wheel 15 from the upper side. In this way, mud, small stones, and the like can be prevented from hitting the wheel apron and the like at the vehicle body B.

The fender liner 20 is supported so as to be fixed to the front fender panel 12 at a fixing/supporting portion 20A shown in FIG. 1. A fixed liner portion 22, which is positioned at the rear side of the fixing/supporting portion 20A at the fender liner 20, is supported so as to be fixed to the front fender panel 12 at the portion other than the fixing/supporting portion 20A. A movable liner portion 24, which is positioned at the front side of the fixing/supporting portion 20A at the fender liner 20, is not supported (i.e., is free) with respect to the front fender panel 12 and the bumper cover 18A.

In the present exemplary embodiment, the fixing/supporting portion 20A is set at a position which is always in front of and above the axle of the front wheel 15. In this way, the fender liner 20 can deform such that the movable liner portion 24 thereof swings with the fixing/supporting portion 20A being the fulcrum. Due to this swinging, a lower portion 24A of the movable liner portion 24 approaches and moves away from the front wheel 15 along the longitudinal direction of the vehicle. The lower portion 24A of the movable liner portion 24 is formed in the shape of a substantially rectangular plate as seen in front view. As shown in FIG. 2B, the lower portion 24A covers, from the front, a region of the front wheel 15 including the front end portion (the top-bottom direction central portion) other than a portion of the vehicle transverse direction outer end side of the front wheel 15.

Figure 2A:
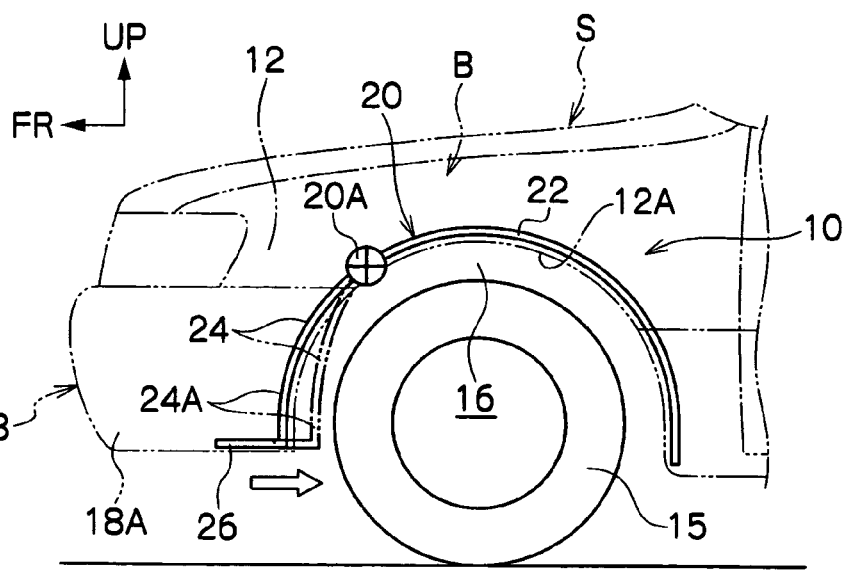
FIGS. 2A through 2C are drawings schematically showing the aerodynamic device for a vehicle relating to the first exemplary embodiment of the present invention, where
Figure 2B:
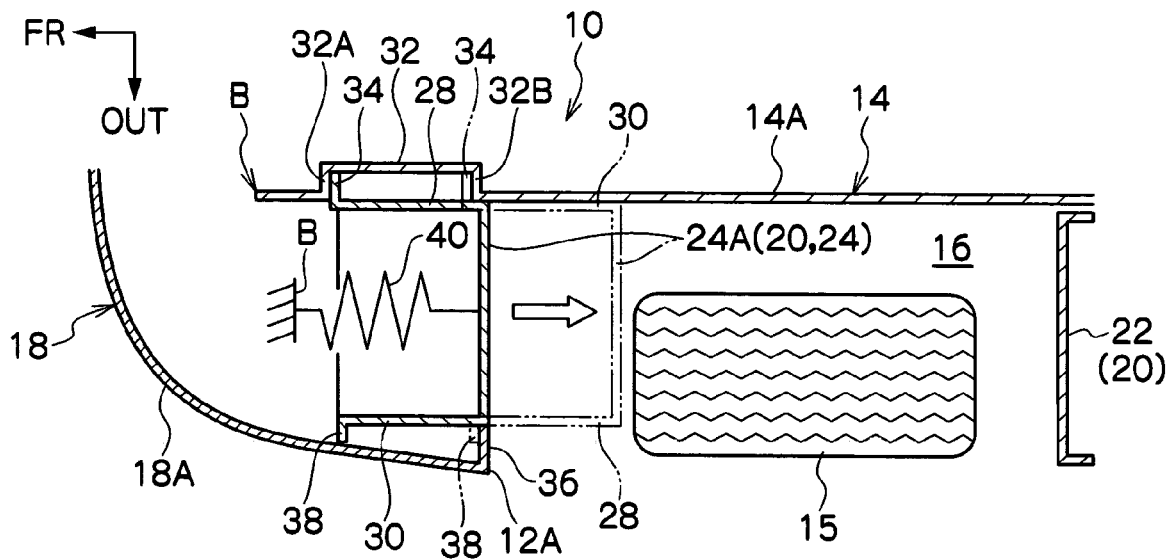

Specifically, the lower portion 24A of the movable liner portion 24 can assume a housed position, in which the lower portion 24A is positioned at the vehicle transverse direction inner side of the bumper cover 18A along the wheel arch 12A as shown by the solid line in FIG. 2A, and a projecting position which is rearward of the housed position and at which the lower portion 24A projects-out rearward of the front portion of the wheel arch 12A, i.e., into the wheel house 16. The projecting position is not a fixed position, and is an unfixed position between the housed position and a rear side movement limit (to be described later) of the lower portion 24A of the movable liner portion 24.

Figure 2C:
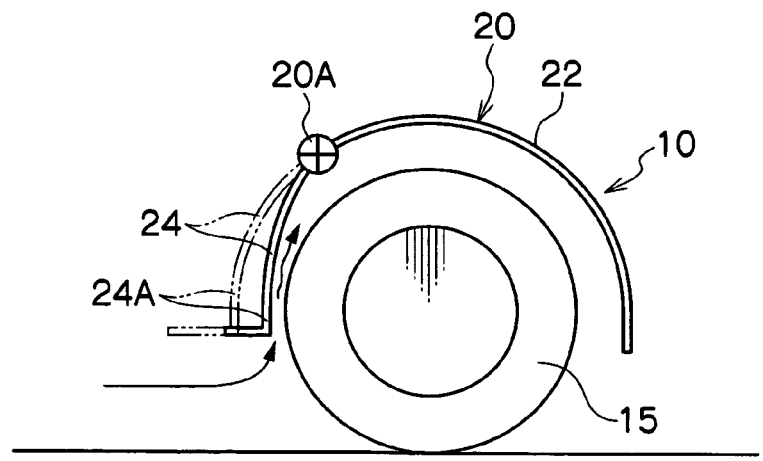

As shown in FIGS. 2A and 2C, the aerodynamic device 10 for a vehicle has a flat-plate-shaped bottom wall portion 26 which is provided so as to extend forward, substantially along a horizontal plane, from the lower end of the movable liner portion 24. In the state in which the lower portion 24A of the movable liner portion 24 is positioned at the projecting position, the bottom wall portion 26 closes, from below, the portion of the wheel house 16 which is further toward the front side than the lower portion 24A of the movable liner portion 24.

Further, as shown in FIG. 2B, the aerodynamic device 10 for a vehicle has an inner side wall 28 and an outer side wall 30, which oppose one another in the vehicle transverse direction, at both vehicle transverse direction sides of the movable liner portion 24 and the bottom wall portion 26. The inner side wall 28 extends along a vertical plane (a plane running along the vehicle top-bottom direction and longitudinal direction) so as to extend between the vehicle transverse direction inner ends of the movable liner portion 24 and the bottom wall portion 26, and functions as a guide portion which, as the movable liner portion 24 moves between the housed position and the projecting position, slides along the surface of the wheel house inner 14A which surface faces outwardly in the vehicle transverse direction.

On the other hand, the outer side wall 30 extends along a vertical plane (a plane running along the vehicle top-bottom direction and longitudinal direction) so as to extend between the vehicle transverse direction outer ends of the movable liner portion 24 and the bottom wall portion 26. In the state in which the lower portion 24A of the movable liner portion 24 is positioned at the projecting position, the outer side wall 30 closes, from the side (the vehicle transverse direction outer side), the portion of the wheel house 16 which is further toward the front side than the lower portion 24A of the movable liner portion 24.

As shown in FIG. 2B, a stopper piece 34, which enters into a stopper concave portion 32 which is formed in the wheel house inner 14A so as to open outwardly in the vehicle transverse direction, extends toward the vehicle transverse direction inner side from the inner side wall 28. At the aerodynamic device 10 for a vehicle, the position at which the stopper piece 34 engages with a front wall 32A of the stopper concave portion 32 is the housed position which is the front side movement limit of the lower portion 24A of the movable liner portion 24. The position at which the stopper piece 34 engages a rear wall 32B of the stopper concave portion 32 is set to be the rear side movement limit of the lower portion 24A of the movable liner portion 24. The rear side movement limit is set as a position at which the lower portion 24A of the movable liner portion 24 does not interfere with the front wheel 15.

A stopper piece 38, which engages with a stopper projection 36 which projects inwardly in the vehicle transverse direction from the front bumper 18 in the state in which the stopper piece 34 engages with the rear wall 32B of the stopper concave portion 32 (i.e., in the state in which the lower portion 24A of the movable liner portion 24 is positioned at the rear side movement limit), projects-out toward the vehicle transverse direction outer side from the outer side wall 30. Accordingly, at the aerodynamic device 10 for a vehicle, in the state in which the lower portion 24A of the movable liner portion 24 is positioned at the rear side movement limit, the stopper piece 34 and the stopper piece 38 engage the rear wall 32B of the stopper concave portion 32 and the stopper projection 36, respectively, at the both sides in the vehicle transverse direction.

The fender liner 20 is structured by the flat-plate-shaped bottom wall portion 26, the inner side wall 28, the outer side wall 30, and respective stopper pieces 34, 38 being formed integrally with the fixed liner portion 22 and the movable liner portion 24 by resin molding.

As shown in FIGS. 1 and 2B, the aerodynamic device 10 for a vehicle has a tension spring 40 serving as an urging member which urges the lower portion 24A of the movable liner portion 24 forward. When the tension spring 40 is in a tensed (extended) state, the front end thereof is anchored on the vehicle body B (a bumper skeleton member or the like), and the rear end thereof is anchored on the lower portion 24A of the movable liner portion 24, and, due to the urging force thereof, the tension spring 40 maintains the movable liner portion 24 at the housed position.

Figure 3A:
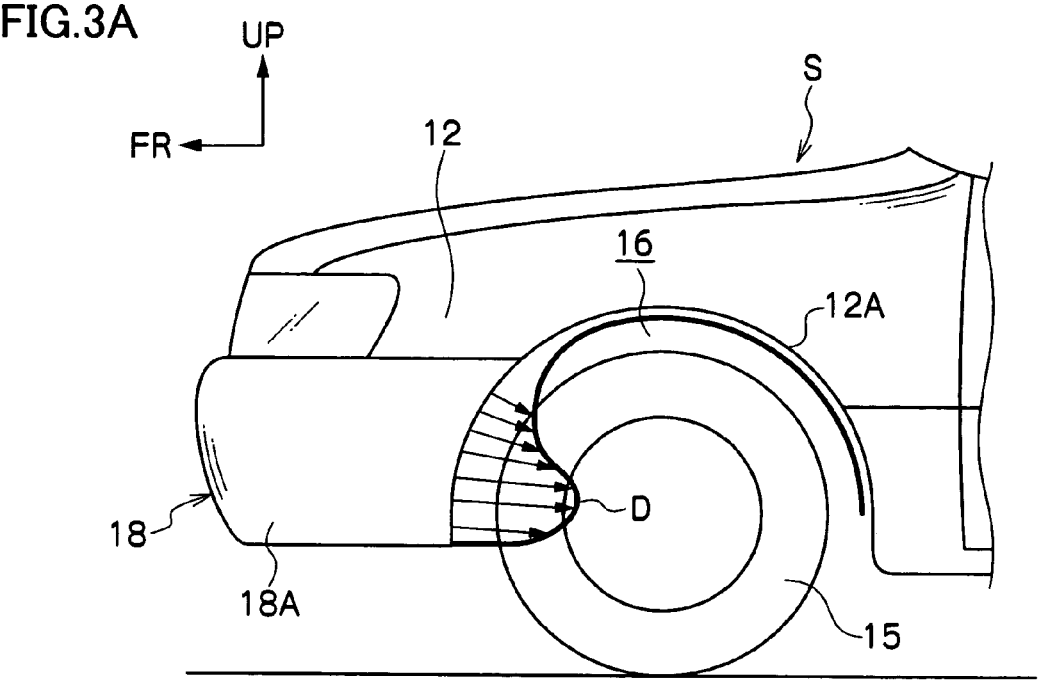
FIGS. 3A and 3B are drawings for explaining negative pressure which is generated within the wheel house in the aerodynamic device for a vehicle relating to the first exemplary embodiment of the present invention, where
Figure 3B:
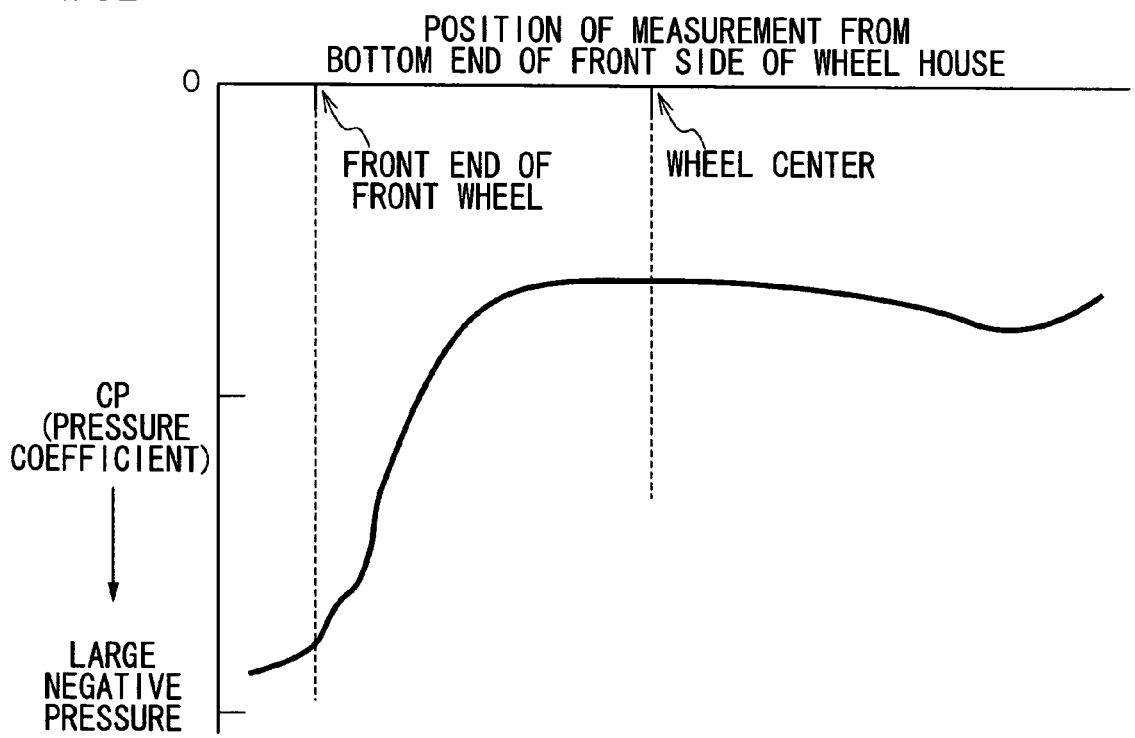

In the above-described aerodynamic device 10, due to the negative pressure which is generated at the front portion of the wheel house 16 as the automobile S travels (advances forward), the lower portion 24A of the movable liner portion 24 moves against the urging force of the tension spring 40 from the housed position to the projecting position. The negative pressure distribution in a case in which the automobile S is traveling at a predetermined speed is shown by line D in FIG. 3A. A graph, in which the distance from the bottom front edge of the wheel arch 12A is plotted on the horizontal axis and the pressure coefficient is plotted on the vertical axis, is shown in FIG. 3B. The line D in FIG. 3A shows that, the further away from the wheel arch 12A, the greater the negative pressure. From these drawings, it can be understood that, due to the negative pressure which is generated at the front portion of the wheel house 16 as the automobile S travels, a strong driving force which is directed substantially rearward is applied to the lower portion 24A of the movable liner portion 24.

The higher the vehicle speed, the stronger the negative pressure, i.e., the driving force. Therefore, the lower portion 24A of the movable liner portion 24 is structured such that, the higher the vehicle speed, the more the lower portion 24A approaches the front surface side of the front wheel 15 (i.e., the further rearward the projecting position). Further, this negative pressure does not decrease due to the lower portion 24A of the movable liner portion 24 being positioned at the projecting position (approaching the front wheel 15), and the lower portion 24A of the movable liner portion 24 is maintained at the projecting position which corresponds to the vehicle speed (a position in balance with the urging force of the tension spring 40).

In the aerodynamic device 10 for a vehicle, setting is carried out such that, when the vehicle speed is 100 km/h, a rearwardly-directed driving force of substantially 20 N acts on the lower portion 24A of the movable liner portion 24 due to the negative pressure accompanying the traveling. Further, setting is carried out such that a rearwardly-directed driving force of substantially 40 N acts on the lower portion 24A of the movable liner portion 24 when the vehicle speed is 140 km/h, and a rearwardly-directed driving force of substantially 80 N acts on the lower portion 24A of the movable liner portion 24 when the vehicle speed is 200 km/h. In the present exemplary embodiment, the spring constant and the initial amount of extension of the tension spring 40 are set such that the lower portion 24A of the movable liner portion 24 reaches the rear side movement limit when a driving force of 20 N is applied rearwardly.

Operation of the first exemplary embodiment will be described next.

In the automobile S to which the aerodynamic device 10 for a vehicle of the above-described structure is applied, when negative pressure is generated at the front portion of the wheel house 16 as the automobile S travels, a rearwardly-directed driving force which is based on the negative pressure acts on the lower portion 24A of the movable liner portion 24. When this driving force is less than or equal to a predetermined value, i.e., when the automobile S is traveling at a low speed, the movable liner portion 24 is maintained at the housed position (or the movement thereof toward the projecting position is slight). In this way, the movable liner portion 24 does not interfere with the front wheel 15 in a case in which, for example, a chain is attached to the front wheel 15, or the like.

On the other hand, when the rearwardly-directed driving force load, which is based on the negative pressure at the front portion of the wheel house 16 which is generated as the automobile S travels, exceeds the predetermined value, the lower portion 24A of the movable liner portion 24 moves to the projecting position which corresponds to the vehicle speed as shown in FIG. 2C. Further, following this movement of the lower portion 24A of the movable liner portion 24 to the projecting position, the bottom wall portion 26, the inner side wall 28, and the outer side wall 30 move to respective projecting positions.

Here, in the automobile S which is equipped with the aerodynamic device 10 for a vehicle, at the time of traveling at a high speed which exceeds a predetermined speed, as described above, the lower portion 24A of the movable liner portion 24 moves to the projecting position and approaches the front wheel 15. Therefore, the entry of air into the wheel house 16 (the aforementioned negative pressure generating portion) is suppressed. Thus, the flow of air which is discharged-out (blown-out) to the side of the vehicle from the wheel house 16 accompanying the traveling is weakened (the blown-out amount and the blow-out pressure are reduced), and disturbance of the flow of air at the side of the front wheel 15 due to the flow of air blown-out to the side of the front wheel 15 is reduced. The air resistance can thereby be reduced. Further, the external force applied to the front wheel is reduced, and the handling stability of the automobile S improves.

Because the bottom wall portion 26 is provided at the aerodynamic device 10 for a vehicle, inflow of air from below into the space in the wheel house 16 at the front of the lower portion 24A of the movable liner portion 24 which is positioned at the projecting position, is prevented. Similarly, because the outer side wall 30 is provided at the aerodynamic device 10 for a vehicle, inflow of air from the side into the space in the wheel house 16 at the front of the lower portion 24A of the movable liner portion 24 which is positioned at the projecting position, is prevented. For these reasons, the drawing-in of air into the vehicle body B accompanying traveling is prevented, and disturbance of the flow of air, due to the lower portion 24A of the movable liner portion 24 moving to the projecting position, is prevented from arising.

In the aerodynamic device 10 for a vehicle, the lower portion 24A of the movable liner portion 24 is made to approach the front wheel 15 by utilizing the negative pressure which is generated at the front of the front wheel 15 within the wheel house 16 as the vehicle travels. Therefore, without using an actuator for driving the lower portion 24A of the movable liner portion 24, or a control device for controlling the operational timing of such an actuator, the lower portion 24A of the movable liner portion 24 moves to the projecting position when the automobile S is traveling at a high speed of greater than or equal to a predetermined vehicle speed, and inflow of air into the wheel house 16 can be suppressed.

By driving the lower portion 24A of the movable liner portion 24 by using the aforementioned negative pressure, the lower portion 24A of the movable liner portion 24 can be positioned at the projecting position corresponding to the vehicle speed, without carrying out control by a control device. Further, by setting the spring constant, the initial amount of extension, and the like of the tension spring 40, it is also easy to form a structure in which the lower portion 24A of the movable liner portion 24 is positioned at the rear side movement limit in cases of greater than or equal to a predetermined vehicle speed (e.g., 70 km/h).

Because the bottom wall portion 26 and the outer side wall 30 are molded integrally with the movable liner portion 24, the bottom wall portion 26 and the outer side wall 30 can, together with the lower portion 24A of the movable liner portion 24, be driven by the aforementioned negative pressure. Further, the bottom wall portion 26 and the outer side wall 30 can be interlocked with (made to follow) the movable liner portion 24, without providing an interlocking mechanism between the movable liner portion 24 and the bottom wall portion 26, the outer side wall 30.

Other exemplary embodiments of the present invention will be described next. Note that parts and portions which are basically the same as those of the above-described first exemplary embodiment or previously-mentioned structures are denoted by the same reference numerals as in the first exemplary embodiment or previously-described structures, and description (and illustration) thereof will be omitted.

Second Exemplary Embodiment

Figure 4:
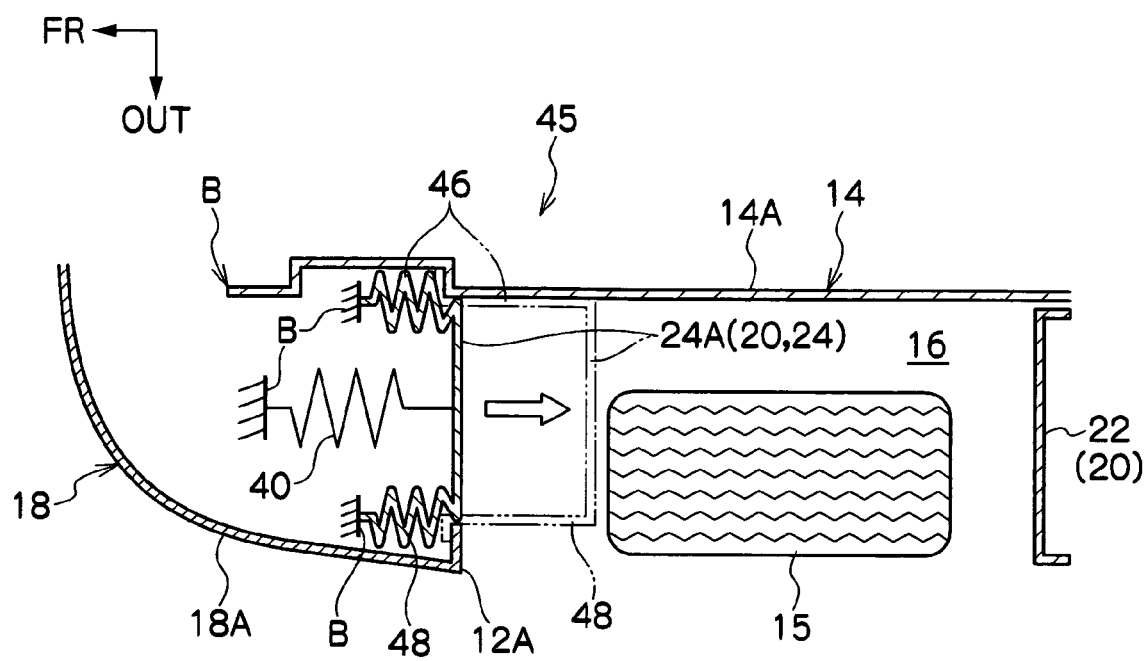
FIG. 4 is a plan sectional view showing an aerodynamic device for a vehicle relating to a second exemplary embodiment of the present invention.

An aerodynamic device 45 for a vehicle relating to a second exemplary embodiment of the present invention is shown in FIG. 4 in a plan sectional view which corresponds to FIG. 2B. As shown in FIG. 4, the aerodynamic device 45 for a vehicle differs from the aerodynamic device 10 for a vehicle relating to the first exemplary embodiment with regard to the point that the aerodynamic device 45 for a vehicle has an extending/contracting inner side wall 46 and an extending/contracting outer side wall 48 instead of the inner side wall 28 and the outer side wall 30.

The extending/contracting inner side wall 46 and the extending/contracting outer side wall 48 are each formed in the shape of bellows. The rear ends thereof are connected to the movable liner portion 24, and the front end portions thereof are fixed to the vehicle body B. Further, the extending/contracting inner side wall 46 and the extending/contracting outer side wall 48 are not connected to the bottom wall portion 26, and, by expanding and contracting, permit movement of the lower portion 24A of the movable liner portion 24 between the housed position and the projecting position. In the aerodynamic device 45 for a vehicle, at the limit of extension of the extending/contracting inner side wall 46 and the extending/contracting outer side wall 48, the lower portion 24A of the movable liner portion 24 reaches the rear side movement limit. At the limit of contraction of the extending/contracting inner side wall 46 and the extending/contracting outer side wall 48, the lower portion 24A of the movable liner portion 24 reaches the housed position (the front side movement limit).

The other structures of the aerodynamic device 45 for a vehicle are the same as the corresponding structures of the aerodynamic device 10 for a vehicle.

Accordingly, in the above-described aerodynamic device 45 for a vehicle, similar effects can be achieved by operation similar to that of the aerodynamic device 10 for a vehicle. Further, by providing the extending/contracting inner side wall 46 and the extending/contracting outer side wall 48 with elasticity which generates restoring force in the contracting direction, a structure which is not provided with the tension spring 40 can be realized.

Third Exemplary Embodiment

Figure 5A:
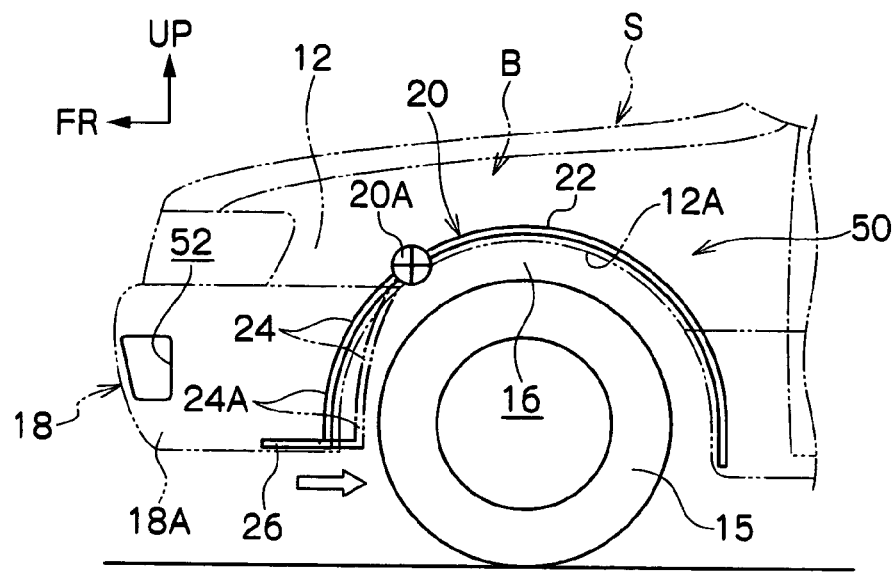
FIGS. 5A and 5B are drawings schematically showing an aerodynamic device for a vehicle relating to a third exemplary embodiment of the present invention, where
Figure 5B:
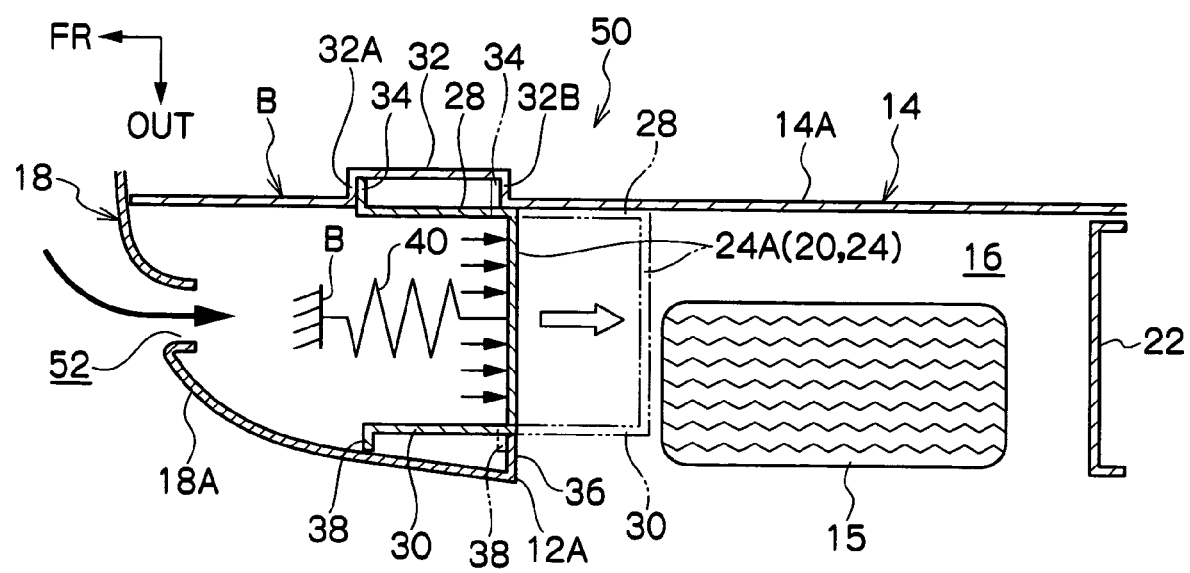

An aerodynamic device 50 for a vehicle relating to a third exemplary embodiment of the present invention is shown in FIG. 5A in a side view corresponding to FIG. 2A. The aerodynamic device 50 for a vehicle is shown in FIG. 5B in a plan sectional view corresponding to FIG. 2B. As shown in FIGS. 5A and 5B, the aerodynamic device 50 for a vehicle differs from the aerodynamic device 10 for a vehicle relating to the first exemplary embodiment with regard to the point that traveling wind (positive pressure), which is introduced-in from an air guiding port 52 formed in the bumper cover 18A of the front bumper 18, is utilized. The other structures of the aerodynamic device 50 for a vehicle are the same as the corresponding structures of the aerodynamic device 10 for a vehicle.

In the automobile S equipped with the aerodynamic device 50 for a vehicle, as the automobile S travels, negative pressure is generated at the front portion of the wheel house 16, and air is introduced-in from the air guiding port 52 to the front surface side of the movable liner portion 24. Mainly force, which pulls the lower portion 24A rearward by the negative pressure of the wheel house 16, and force, which pushes the lower portion 24A rearward by the positive pressure of the traveling wind introduced-in from the air guiding port 52, are applied to the lower portion 24A of the movable liner portion 24. When these driving forces exceed a predetermined load, the lower portion 24A of the movable liner portion 24 moves to a projecting position which corresponds to the vehicle speed.

In this way, in the aerodynamic device 50 for a vehicle as well, because the lower portion 24A of the movable liner portion 24 is moved to a projecting position as the vehicle travels, similar effects can be obtained by operation which is basically similar to that of the aerodynamic device 10 for a vehicle. Further, in the aerodynamic device 50 for a vehicle, the traveling wind which is introduced-in from the air guiding port 52 also is used in driving the lower portion 24A of the movable liner portion 24. Therefore, for example, the lower portion 24A of the movable liner portion 24 can be driven at a lower speed, or the aerodynamic device 50 for a vehicle can be applied as well to vehicles in which the driving force due to the negative pressure of the wheel house 16 is insufficient due to design constraints or the like.

Fourth Exemplary Embodiment

Figure 6:
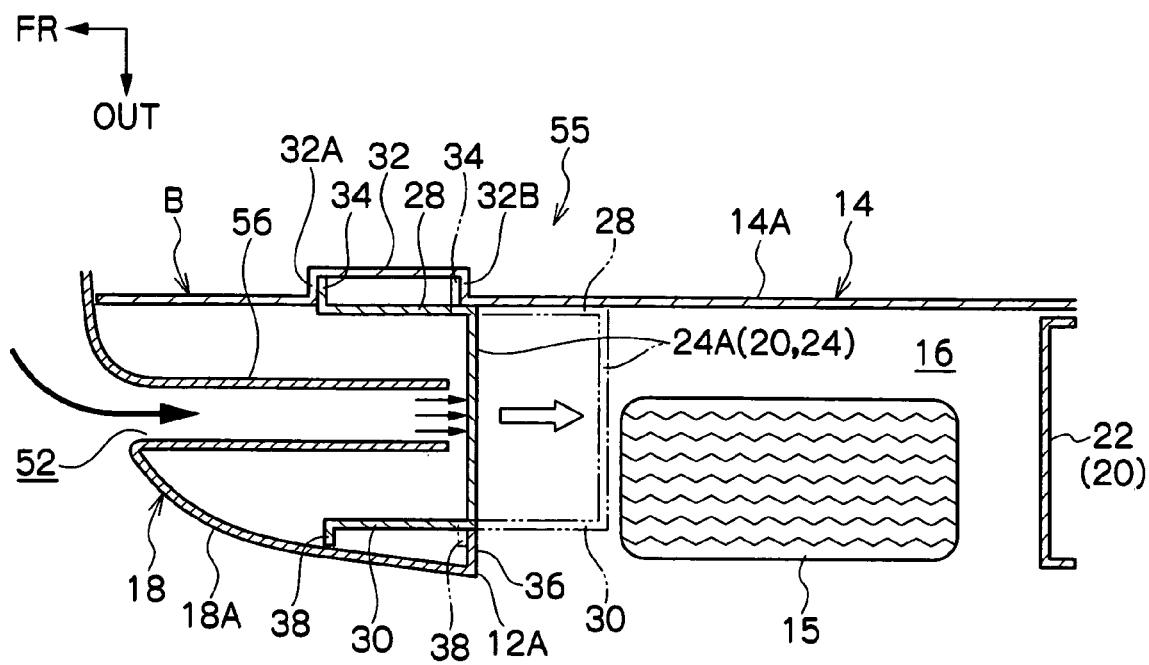
FIG. 6 is a plan sectional view showing an aerodynamic device for a vehicle relating to a fourth exemplary embodiment of the present invention.

An aerodynamic device 55 for a vehicle relating to a fourth exemplary embodiment of the present invention is shown in FIG. 6 in a plan sectional view corresponding to FIG. 5B. As shown in FIG. 6, the aerodynamic device 55 for a vehicle differs from the aerodynamic device 50 for a vehicle relating to the third exemplary embodiment with regard to the point that a duct 56 which extends downward from the edge portion of the air guiding port 52 is provided.

The duct 56 concentratedly guides, to the front surface of the lower portion 24A of the movable liner portion 24, the traveling wind which is introduced-in from the air guiding port 52. In this way, as compared with the aerodynamic device 50 for a vehicle, the driving moment (arm) around the fixing/supporting portion 20A which is applied to the movable liner portion 24 becomes large, and the driving force of the lower portion 24A of the movable liner portion 24 due to the positive pressure increases. The other structures of the aerodynamic device 55 for a vehicle are the same as the corresponding structures of the aerodynamic device 50 for a vehicle.

Accordingly, in the above-described aerodynamic device 55 for a vehicle, similar effects can be obtained by operation which is similar to that of the aerodynamic device 50 for a vehicle. Further, because the traveling wind can be concentratedly guided to a specific region by the duct 56, it is also possible to realize a structure in which, for example, a bag-shaped pressure-receiving portion, which makes the duct 56 slidably (in a sealed state) enter-in at the front surface side of the lower portion 24A of the movable liner portion 24, is provided, and only the positive pressure works so as to not generate an unneeded flow of air.

Fifth Exemplary Embodiment

An aerodynamic device 60 for a vehicle relating to a fifth aspect of the present invention is shown in FIG. 7A in a side view corresponding to FIG. 2A. The aerodynamic device 60 for a vehicle is shown in FIG. 7B in a plan sectional view corresponding to FIG. 2B. Further, an operating state of the aerodynamic device 60 for a vehicle is shown in a side view in FIG. 7C. As shown in these figures, the aerodynamic device 60 for a vehicle differs from the aerodynamic device 10 for a vehicle relating to the first exemplary embodiment with regard to the point that an outer side wall 62 is provided instead of the outer side wall 30.

As shown in FIGS. 7B and 7C, the outer side wall 62 structures a portion which is positioned further toward the front side than the front portion of the wheel arch 12A at the front fender panel 12 and the bumper cover 18A. Specifically, a slit 64, which opens substantially toward the rear, is formed further toward the front side than the front portion of the wheel arch 12A at the front fender panel 12 and the bumper cover 18A, and the outer side wall 62 is inserted through this slit 64. In this way, a rear side portion 66, which is rearward of the slit 64 at the front fender panel 12 and the bumper cover 18A, is covered by the outer side wall 62 from the outer side in the vehicle transverse direction.

The outer side wall 62 is structured substantially flush with the front fender panel 12 and the bumper cover 18A (i.e., exists along the front fender panel 12 and the bumper cover 18A), and forms a portion of the front fender panel 12 and the bumper cover 18A as described above. In other words, in the state in which the movable liner portion 24 is positioned at the housed position, a rear edge portion 62A, which forms the corner which is the border with the movable liner portion 24 at the outer side wall 62, prescribes the front portion of the wheel arch 12A.

On the other hand, a front portion 62B of the outer side wall 62 slidably contacts the inner surfaces of the front fender panel 12 and the bumper cover 18A. While elastically deforming appropriately as the lower portion 24A of the movable liner portion 24 moves from the housed position to the projecting position, the front portion 62B of the outer side wall 62 moves to a position at which it covers, from the outer side in the vehicle transverse direction, the rear side portion 66 which is rearward of the slit 64 at the front fender panel 12 and the bumper cover 18A. In this way, in the state in which the movable liner portion 24 is positioned at the projecting position, as shown in FIG. 7C, the outer side wall 62 is positioned further rearward than the wheel arch 12A while maintaining its state of being substantially flush with the front fender panel 12 and the bumper cover 18A (without a step).

In this way, at the aerodynamic device 60 for a vehicle, by positioning the movable liner portion 24 at the projecting position, it is as if the front fender panel 12 and the bumper cover 18A extend rearwardly. In the present exemplary embodiment, because the surface area (range) of rearward extension of the front fender panel 12 and the bumper cover 18A by the outer side wall 62 is made to be large, the fixing/supporting portion 20A is shifted rearward as compared with the above-described respective exemplary embodiments. In the present example, the fixing/supporting portion 20A is disposed at a portion substantially directly above the axle of the front wheel 15.

Further, a stopper piece 68, which is formed in the shape of a hook, projects inwardly in the vehicle transverse direction from the front end of the front portion 62B of the outer side wall 62. At the rear side movement limit of the movable liner portion 24 (the position of engagement between the stopper piece 34 and the rear wall 32B of the stopper concave portion 32), the stopper piece 68 engages with an edge portion 64A at a vehicle transverse direction position side of the slit 64.

The other structures of the aerodynamic device 60 for a vehicle are the same as the corresponding structures of the aerodynamic device 10 for a vehicle.

Accordingly, in the above-described aerodynamic device 60 for a vehicle, similar effects can be achieved by operation which is similar to that of the aerodynamic device 10 for a vehicle. Further, in the aerodynamic device 60 for a vehicle, at times when the automobile S to which it is applied travels at high speeds exceeding a predetermined speed, the outer side wall 62 is substantially flush with the front fender panel 12 and the bumper cover 18A, and slides rearward. In other words, the front fender panel 12 and the bumper cover 18A are extended rearward. Therefore, the flow regulating region at the side surface of the vehicle body B is enlarged from region X shown in FIG. 7B to region Y, and the flow regulating operation at the side surface of the vehicle body B improves. In this way, at the aerodynamic device 60 for a vehicle, together with the flow regulating effect (the suppression of blowing-out of air toward the side of the vehicle body) due to the movable liner portion 24 moving to the projecting position, the handling stability of the automobile S to which the aerodynamic device 60 for a vehicle is applied can be improved even more.

In particular, in off-road vehicles and the like in which the stroke of the front wheel 15 (suspension) with respect to the vehicle body B is large, the amount of separation between the front wheel 15 and the wheel arch 12A (the fender liner 20) at usual times (times of stopping or times of traveling at low speed) is set to be large. Therefore, it is difficult to ensure a flow regulating region at the side surface of the vehicle body B at times of traveling at high speeds exceeding a predetermined speed. However, by applying the aerodynamic device 60 for a vehicle, which slides the outer side wall 62 rearward at times of traveling at high speeds exceeding a predetermined speed, the flow regulating effect at the side surface of the vehicle body B can be improved in off-road vehicles and the like as well.

Sixth Exemplary Embodiment

Figure 8A:
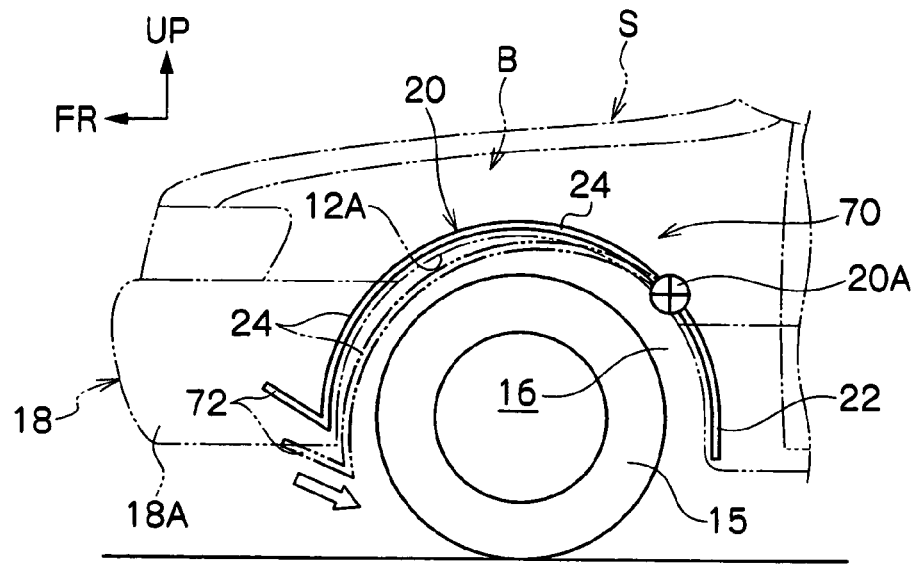
FIGS. 8A and 8B are drawings schematically illustrating an aerodynamic device for a vehicle relating to a sixth exemplary embodiment of the present invention, where
Figure 8B:
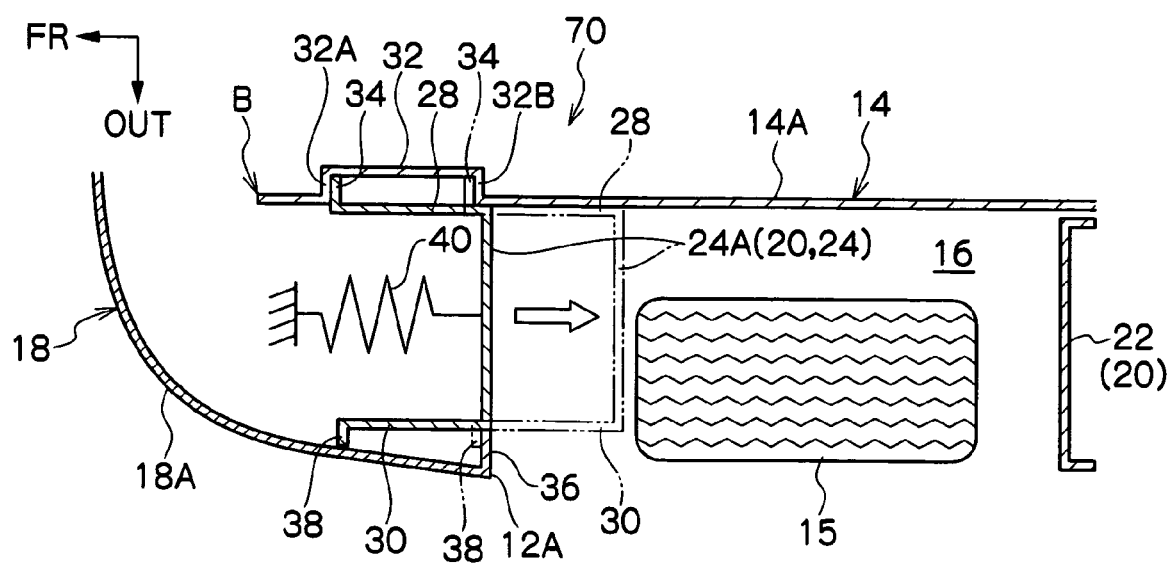

An aerodynamic device 70 for a vehicle relating to a sixth exemplary embodiment of the present invention is shown in FIG. 8A in a side view corresponding to FIG. 2A. The aerodynamic device 70 for a vehicle is shown in FIG. 8B in a plan sectional view corresponding to FIG. 2B. As shown in FIGS. 8A and 8B, the aerodynamic device 70 for a vehicle differs from the aerodynamic device 10 for a vehicle relating to the first exemplary embodiment with regard to the point that a movable spat 72 serving as a flow regulating member is provided instead of the bottom wall portion 26.

Specifically, in the present exemplary embodiment, the fixing/supporting portion 20A is positioned even further rearward than its position in the fifth exemplary embodiment, and the structural portion of the movable liner portion 24 at the fender liner 20 is made to be large. In the present exemplary embodiment, the fixing/supporting portion 20A is always disposed at a position which is rearward and upward of the axle of the front wheel 15. In this way, in the aerodynamic device 70 for a vehicle, the lower portion 24A of the movable liner portion 24 moves backwardly and moves to the projecting position while moving downward with respect to the housed position.

The movable spat 72 is formed so as to be folded over toward the front upper side from the lower end of the lower portion 24A of the movable liner portion 24. In the state in which the lower portion 24A of the movable liner portion 24 is positioned at the projecting position, the portion of the movable spat 72 other than the front end thereof is at a protruding position at which it protrudes-out downward of the bottom front edge of the wheel arch 12A and forward of the front wheel 15. As shown by the imaginary line in FIG. 8A, the movable spat 72 which is at the protruding position forms a rectangular shape which is long in the vehicle transverse direction as seen in front view, and which, in side view, has an inclined posture in which the rear side thereof is lower (closer to the road surface) than the front side.

In this way, the movable spat 72 which is positioned at the protruding position guides the rearwardly-directed air flow, which arises as the automobile S travels, downward (refer to the white arrow in FIG. 8A). In other words, the movable spat 72 suppresses the phenomenon of air hitting the front surface of the front wheel 15 (reduces the amount of air hitting the front surface of the front wheel 15), and can reduce the amount of air which is sucked-into the wheel house 16. Although not illustrated, the stopper concave portion 32 permits the rearward, downward displacement of the lower portion 24A of the movable liner portion 24 from the housed position toward the projecting position, and, at the rear side movement limit, causes the rear wall 32B to engage with the stopper piece 34.

Other structures of the aerodynamic device 70 for a vehicle are the same as the corresponding structures of the aerodynamic device 10 for a vehicle. Note that, in the present exemplary embodiment, the movable liner portion 24, which moves the moveable stopper 72 to the protruding position due to the negative pressure arising at the front lower portion of the wheel house 16 as the automobile S travels, corresponds to the "driving means" of the present invention.

Accordingly, in the aerodynamic device 70 for a vehicle, similar effects can be achieved by operation which is similar to that of the aerodynamic device 10 for a vehicle. Further, in the aerodynamic device 70 for a vehicle, in the state in which the lower portion 24A of the movable liner portion 24 is positioned at the projecting position, i.e., when the automobile S travels at high speeds exceeding a predetermined speed, the movable spat 72 is positioned at the protruding position, and therefore, the amount of air which hits the front wheel 15 is reduced. Due to the synergistic effect of the effect of reducing the amount of air which hits the front wheel 15 and the effect of contracting the flow path due to the lower portion 24A of the movable liner portion 24 approaching the front wheel 15, the amount of air which enters into the wheel house 16 (the above-described negative pressure generating portion) is greatly reduced. Accordingly, the handling stability of the automobile S is improved even more, and the air resistance of the automobile S is reduced even more.

Further, in the aerodynamic device 70 for a vehicle, the movable liner portion 24, which is driven by the negative pressure accompanying the traveling of the automobile S, is used as the driving means of the movable spat 72. Control (regulating) of the forward and rearward movement (the change in the protruding amount) of the movable spat 72 with respect to the vehicle body B corresponding to the traveling speed, is thereby realized without using the power of an actuator or the like. Moreover, when the automobile S is traveling at low speed, the movable spat 72 is positioned at the housed position which is at the upper side of the bottom front edge of the wheel arch 12A, and therefore, interference with the road surface is prevented. Note that the movable spat 72 may be disposed so as to protrude slightly with respect to the bottom front edge of the wheel arch 12A when the automobile S is traveling at low speed (is stopped).

Seventh Exemplary Embodiment

Figure 9:
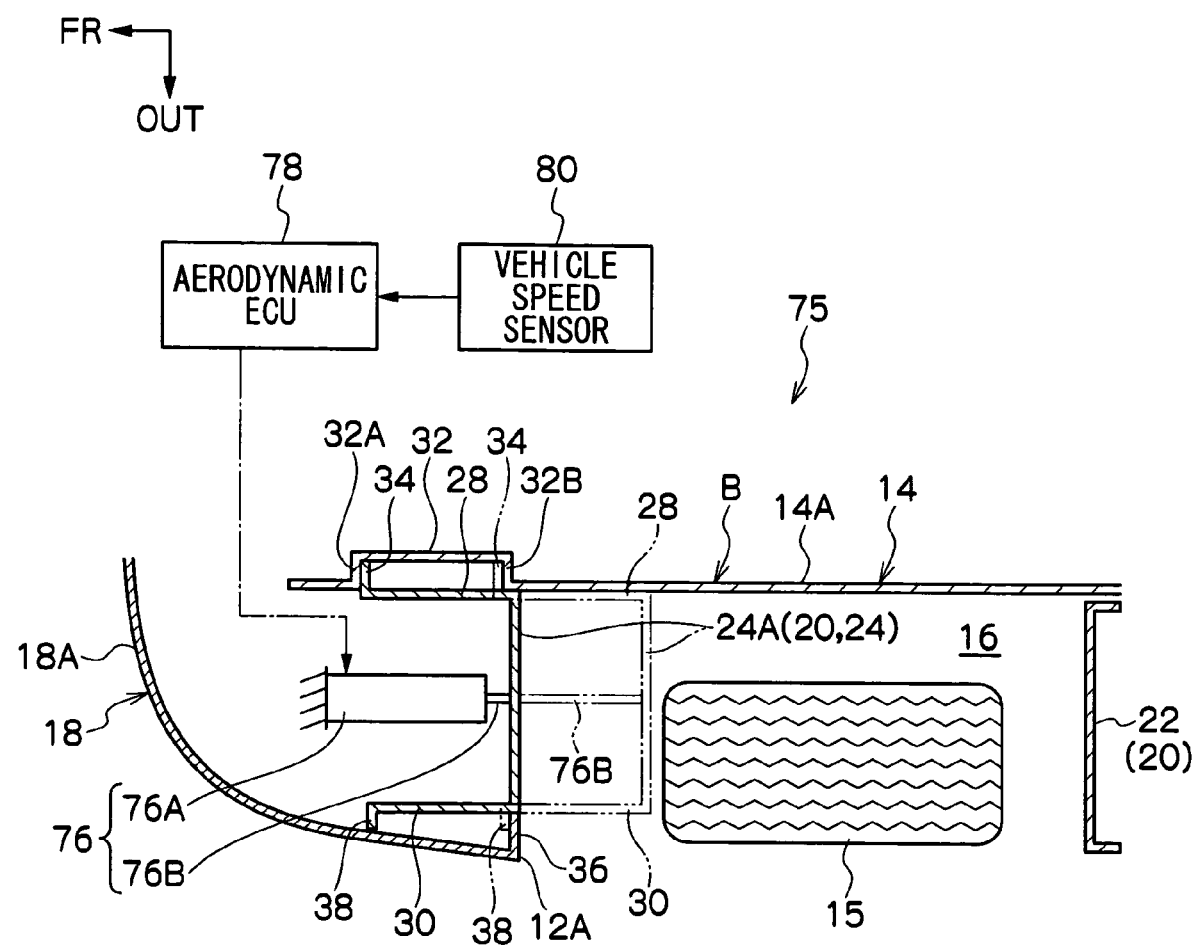
FIG. 9 is a plan sectional view showing an aerodynamic device for a vehicle relating to a seventh exemplary embodiment of the present invention.
Figure 10:
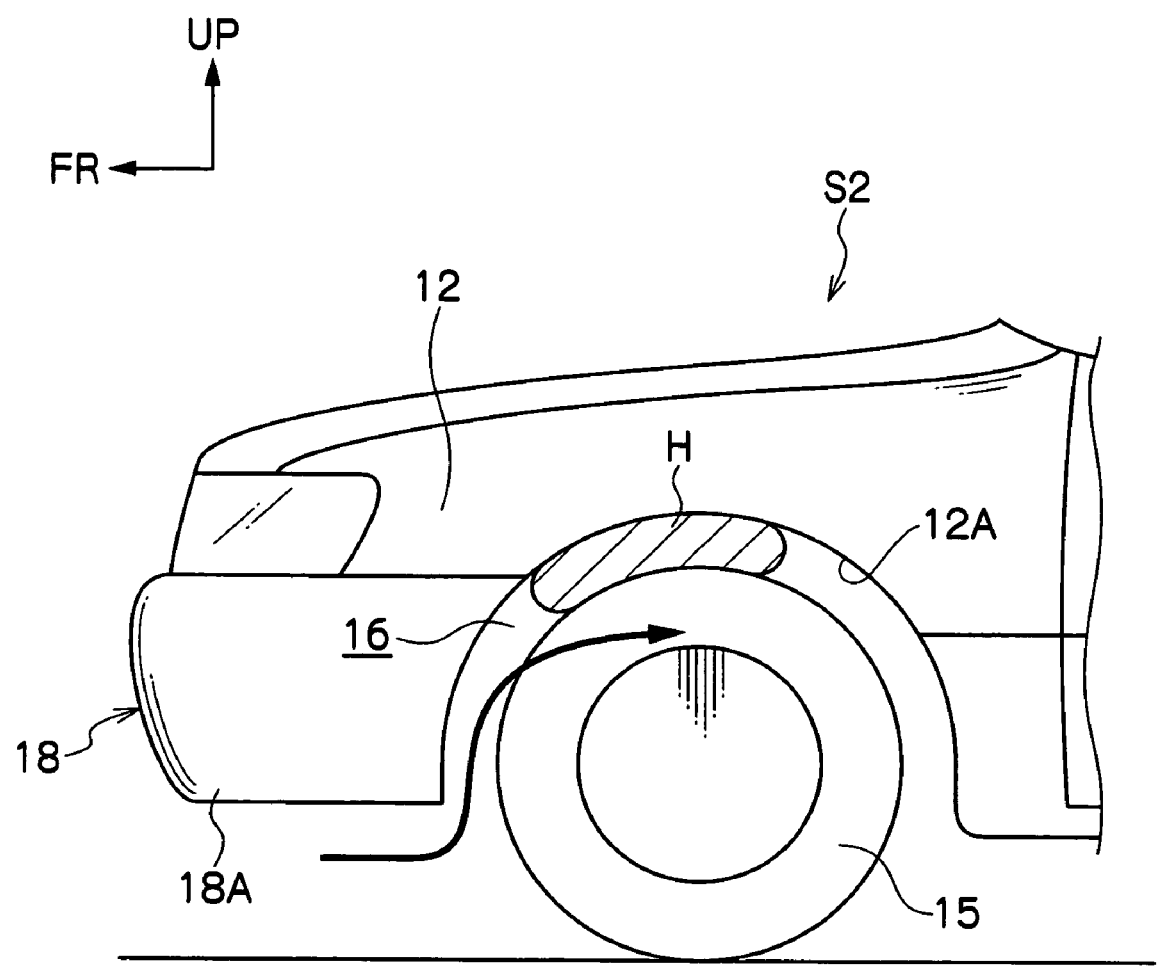
FIG. 10 is a side view of an automobile relating to a comparative example for contrast with automobiles to which the aerodynamic devices for a vehicle relating to the exemplary embodiments of the present invention are applied.

An aerodynamic device 75 for a vehicle relating to a seventh exemplary embodiment of the present invention is shown in FIG. 9 in a plan sectional view corresponding to FIG. 2B. As shown in FIG. 9, the aerodynamic device 75 for a vehicle differs from the aerodynamic device 10 for a vehicle relating to the first exemplary embodiment with regard to the point that an actuator 76 for moving the movable liner portion 24 between the housed position and the projecting position is provided.

The actuator 76 has a main body 76A which is fixed to the vehicle body B (a bumper skeleton member or the like), and a driving rod 76B whose rear end is anchored on the lower portion 24A of the movable liner portion 24 and which is provided so as to be able to extend and contract rearwardly with respect to the main body 76A. At the contracted side movement limit of the driving rod 76B with respect to the main body 76A, the actuator 76 positions the lower portion 24A of the movable liner portion 24 at the housed position. At the extended side movement limit of the driving rod 76B, the actuator 76 positions the lower portion 24A of the movable liner portion 24 at the rear side movement limit (the maximum projected position).

An unillustrated spring, which urges the driving rod 76B toward the contracted side with respect to the main body 76A, is included in the actuator 76. Due to the urging force of the spring, the actuator 76 usually maintains the lower portion 24A of the movable liner portion 24 at the housed position. A power source such as, for example, a hydraulic device, an electric power mechanism including an electric motor, or the like, is included in the main body 76A of the actuator 76. By operating, the power source causes the driving rod 76B to extend with respect to the main body 76A against the urging force of the spring. Note that the actuator 76 may be structured so as to selectively switch between two positions which are the contracted side movement limit and the extended side movement limit. Or, the actuator 76 may be structured so as to be able to assume an arbitrary position or a plurality of positions between the contracted side movement limit and the extended side movement limit.

The actuator 76 is electrically connected to an aerodynamic ECU 78 which serves as a control device. The aerodynamic ECU 78 is electrically connected to a vehicle speed sensor 80, and a signal corresponding to the traveling speed of the automobile S is inputted to the aerodynamic ECU 78 from this vehicle speed sensor 80. When the aerodynamic ECU 78 judges, on the basis of the signal of the vehicle speed sensor 80, that the traveling speed of the automobile S is less than or equal to a predetermined threshold value, the aerodynamic ECU 78 maintains the lower portion 24A of the movable liner portion 24 at the housed position, without operating the actuator 76.

On the other hand, when the aerodynamic ECU 78 judges, on the basis of the signal of the vehicle speed sensor 80, that the traveling speed of the automobile S exceeds the predetermined threshold value, the aerodynamic ECU 78 operates the actuator 76 such that the lower portion 24A of the movable liner portion 24 is moved to the projecting position. In a case in which the actuator 76 is structured so as to selectively switch between two positions which are the contracted side movement limit and the extended side movement limit, the aerodynamic ECU 78 moves the driving rod 76B between the movement limits. In a case in which the actuator 76 is structured so as to be able to assume a plurality of positions between the contracted side movement limit and the extended side movement limit, the aerodynamic ECU 78 varies the projecting position in accordance with the traveling speed.

The other structures of the aerodynamic device 75 for a vehicle are the same as the corresponding structures of the aerodynamic device 10 for a vehicle.

Accordingly, in the above-described aerodynamic device 75 for a vehicle, similar effects can be obtained by operation which is similar to that of the aerodynamic device 10 for a vehicle, except for the point that the driving of the lower portion 24A of the movable liner portion 24 to the projecting position is carried out by the power of an actuator.

Further, in the aerodynamic device 75 for a vehicle, because the lower portion 24A of the movable liner portion 24 is driven by an actuator, the lower portion 24A of the movable liner portion 24 can move to a desired position without relying on the negative pressure of the wheel house 16, i.e., the traveling speed of the automobile S. Accordingly, for example, each of the aerodynamic devices 10 for a vehicle, which are provided so as to correspond to the left and right front wheels 15, can be controlled independently of one another in accordance with the state of turning (steering) or the state of the side wind or the like. Note that in a structure in which the lower portion 24A of the movable liner portion 24 is driven by an actuator in this way, variations such as illustrated in the second through sixth exemplary embodiments may of course be added.

Note that each of the above-described exemplary embodiments shows an example in which the aerodynamic device 10 for a vehicle or the like is applied to the front wheels 15, but the present invention is not limited to the same. For example, the aerodynamic device 10 for a vehicle or the like relating to the present invention may be applied to the rear wheels. Further, the aerodynamic devices 10 for a vehicle or the like may of course be applied to all of the front and rear wheels.

The above-described exemplary embodiments show examples in which the movable liner portion 24 is switched between the housed position and the projecting position by deformation such that it swings around the fixing/supporting portion 20A of the fender liner 20. However, the present invention is not limited to the same. For example, the fixing/supporting portion 20A may be made to be a hinge structure, and the movable liner portion 24 may be rotated around the hinge shaft and switched between the housed position and the projecting position. Or, for example, the movable liner portion 24 may be supported at the vehicle body B so as to be able to slide in the longitudinal direction of the vehicle (so as to be able to approach and move away from the front wheel 15), and may be switched between the housed position and the projecting position by this sliding.

In the respective exemplary embodiments described above, the lower portion 24A of the movable liner portion 24 is housed to the housed position by the urging force of the tension coil spring 40 or the like, but the present invention is not limited to the same. For example, the lower portion 24A of the movable liner portion 24 may be structured so as to be housed in the housed position by the elastic force (restoring force) of the fender liner 20 itself (a resin plate) which is formed from a hard resin material.

Moreover, examples in which the movable liner portion 24 structures the front portion of the fender liner 20 are shown in the above-described exemplary embodiments, but the present invention is not limited to the same. For example, the movable liner portion 24 may be a part which is independent of the fender liner 20 (a structure which does not exhibit the function of the fender liner 20).

What is claimed is:

1. An aerodynamic device for a vehicle comprising:
an aerodynamic member mounted so as to be able to, in a vehicle longitudinal direction, approach and move away from a vehicle longitudinal direction front side portion of a wheel, within a wheel house in which the wheel is disposed.

2. The aerodynamic device for a vehicle of claim 1, wherein the aerodynamic member is formed in the shape of a plate which covers, from a front side in the vehicle longitudinal direction, a region which includes a central portion of the wheel in a vehicle top-bottom direction.

3. The aerodynamic device for a vehicle of claim 1, wherein the aerodynamic member includes a portion which is positioned at a front side of the wheel in the vehicle longitudinal direction, at a fender liner which covers an upper portion of the wheel from above in a vehicle top-bottom direction.

4. The aerodynamic device for a vehicle of claim 1, wherein the aerodynamic member is set so as to approach the front side portion of the wheel more when a traveling speed of a vehicle is high than when the traveling speed is low.

5. The aerodynamic device for a vehicle of claim 4, wherein the aerodynamic member is supported at a vehicle body so as to approach the front side portion of the wheel due to negative pressure which arises at a front of the wheel in the vehicle longitudinal direction within the wheel house accompanying traveling of the vehicle.

6. The aerodynamic device for a vehicle of claim 1, further comprising:
a bottom wall portion provided interlockably with the aerodynamic member, and covering a front portion of the wheel house from below in a vehicle top-bottom direction in a state in which the aerodynamic member is near a front surface side of the wheel.

7. The aerodynamic device for a vehicle of claim 1, further comprising:
a side wall portion provided interlockably with the aerodynamic member, and covering a front portion of the wheel house from an outer side in a vehicle transverse direction in a state in which the aerodynamic member is near a front surface side of the wheel.

8. The aerodynamic device for a vehicle of claim 7, wherein the side wall portion extends along an outer side surface of a vehicle body.

9. The aerodynamic device for a vehicle of claim 6, wherein the bottom wall portion is formed integrally with the aerodynamic member.

10. The aerodynamic device for a vehicle of claim 7, wherein the side wall portion is formed integrally with the aerodynamic member.

11. The aerodynamic device for a vehicle of claim 1, wherein the aerodynamic member includes a flow regulating portion which is positioned forward of the wheel and downward of a front edge portion of the wheel house and which is for regulating a flow of air accompanying traveling of a vehicle, the flow regulating portion being formed such that an amount of protrusion of the flow regulating portion downward of the front edge portion of the wheel house increases accompanying operation of the aerodynamic member approaching the front side portion of the wheel.

12. An aerodynamic device for a vehicle comprising:
a flow regulating member, which is positioned forward of a wheel and downward of a front edge portion of a wheel house, for regulating a flow of air which accompanies traveling of a vehicle; and
a driving structure driving the flow regulating member such that an amount of protrusion of the flow regulating member downward with respect to the front edge portion of the wheel house increases, by negative pressure which is generated at a front side of the wheel within the wheel house accompanying traveling of the vehicle.

13. An aerodynamic device for a vehicle comprising:
an aerodynamic member having a movable surface within a wheel house in which a wheel is disposed, the movable surface being disposed so as to face a vehicle longitudinal direction front side portion of the wheel; and
a moving structure moving the movable surface so as to make the movable surface approach the front side portion of the wheel in accordance with a speed of a vehicle.

14. The aerodynamic device for a vehicle of claim 13, wherein the movable surface includes a plate-shaped surface which covers, from a front side in the vehicle longitudinal direction, a region which includes a central portion of the wheel in a vehicle top-bottom direction.

15. The aerodynamic device for a vehicle of claim 13, wherein the moving structure moves the movable surface so as to make the movable surface approach the front side portion of the wheel more when a traveling speed of the vehicle is high than when the traveling speed is low.

16. The aerodynamic device for a vehicle of claim 13, wherein the moving structure supports the aerodynamic member so as to move the movable surface by negative pressure arising at a front of the wheel in the vehicle longitudinal direction accompanying traveling of the vehicle.

17. The aerodynamic device for a vehicle of claim 13, wherein the moving structure is structured such that the movable surface rotates around a predetermined axis.

18. The aerodynamic device for a vehicle of claim 13, wherein the moving structure is structured such that the movable surface moves in the vehicle longitudinal direction.

* * * * *